(12) United States Patent
Kwon et al.

(10) Patent No.: US 9,019,461 B2
(45) Date of Patent: Apr. 28, 2015

(54) LIQUID CRYSTAL DISPLAY APPARATUSES

(75) Inventors: Yong-Hoon Kwon, Asan-si (KR);
Byoung Dae Ye, Yongin-si (KR);
JoongHyun Kim, Asan-si (KR);
Hyeeun Park, Hwaseong-si (KR);
SungKu Baek, Suwon-si (KR);
Young-Jun Seo, Seoul (KR)

(73) Assignee: Samsung Display Co., Ltd. (KR)

( * ) Notice: Subject to any disclaimer, the term of this patent is extended or adjusted under 35 U.S.C. 154(b) by 300 days.

(21) Appl. No.: 13/546,557

(22) Filed: Jul. 11, 2012

(65) Prior Publication Data

US 2013/0027653 A1    Jan. 31, 2013

(30) Foreign Application Priority Data

Jul. 27, 2011    (KR) .......................... 10-2011-0074600

(51) Int. Cl.
*G02F 1/1333* (2006.01)
*B82Y 20/00* (2011.01)
*G02F 1/1335* (2006.01)

(52) U.S. Cl.
CPC ........... *B82Y 20/00* (2013.01); *G02F 1/133382* (2013.01); *G02F 1/1336* (2013.01)

(58) Field of Classification Search
USPC .......................................... 349/161
See application file for complete search history.

(56) References Cited

U.S. PATENT DOCUMENTS

2006/0139501 A1*  6/2006  Lee et al. ................. 349/21

FOREIGN PATENT DOCUMENTS

| JP | 2009258145 A | 11/2009 |
| KR | 1020010076587 A | 8/2001 |
| KR | 1020050025825 A | 3/2005 |

* cited by examiner

*Primary Examiner* — Wen-Ying P Chen
(74) *Attorney, Agent, or Firm* — Cantor Colburn LLP

(57) ABSTRACT

A liquid crystal display apparatus includes a liquid crystal display panel which displays an image, a light guide plate, a backlight unit including a light source part which generates and supplies light, and a panel temperature adjusting member on a surface of the liquid crystal display panel. The panel temperature adjusting member includes a transparent resistor, and a power supply which supplies power to the transparent resistor. The transparent resistor emits a larger amount of heat to a region of the liquid crystal display panel, which is distant from the light source part, than to a region close to the light source part, such that the liquid crystal display panel has uniform temperature distribution.

20 Claims, 8 Drawing Sheets

LIQUID CRYSTAL DISPLAY APPARATUSES

This application claims priority to Korean Patent Application No. 10-2011-0074600, filed on Jul. 27, 2011, and all the benefits accruing therefrom under 35 U.S.C. §119, the entire contents of which are hereby incorporated by reference.

BACKGROUND OF THE INVENTION (1) Field of the Invention

The invention disclosed herein relates to a liquid crystal display apparatus, and more particularly, to a liquid crystal display apparatus having improved displaying quality.

(2) Description of the Related Art

Liquid crystal display apparatuses employing a liquid crystal display panel are slim, light-weight, and low in power consumption, like display apparatuses employing a plasma display panel ("PDP").

In such a liquid crystal display apparatus, liquid crystal molecules are arrayed in a certain direction within a liquid crystal layer, and external light passes through the liquid crystal layer, to thereby form an image. At this point, refractivity of the liquid crystal layer varies according to an arrangement degree of the liquid crystal molecules. In this case, arrangement speed of the liquid crystal molecules, that is, liquid crystal response speed depends on temperature of liquid crystals.

While a liquid crystal display apparatus is operated, temperature of the liquid crystal layer may be uneven. In this case, liquid crystal response speed may vary according to portions of the liquid crystal layer. In this state, while the liquid crystal apparatus forms a moving image, liquid crystal molecules may be incompletely arrayed in a portion of the liquid crystal layer. Accordingly, displaying quality of the liquid crystal display apparatus may be degraded.

BRIEF SUMMARY OF THE INVENTION

The invention provides a liquid crystal display apparatus having improved displaying quality.

Embodiments of the invention provide liquid crystal display apparatuses including a liquid crystal display panel displaying an image, a light guide plate, a backlight unit including a light source part which generates and provides light at a side of the light guide plate, and a panel temperature adjusting member disposed on a surface of the liquid crystal display panel.

The panel temperature adjusting member includes a transparent resistor, and a power supply which supplies power to the transparent resistor. The transparent resistor emits a larger amount of heat to a region of the liquid crystal display panel, which is distant from the light source part, than to a region close to the light source part, such that the liquid crystal display panel has uniform temperature distribution.

In some embodiments, the transparent resistor may include a transparent conductive film. A thickness of the transparent conductive film in a region close to the light source part may be greater than a thickness of the transparent conductive film in a region distant from the light source part.

In other embodiments, the transparent resistor may include transparent conductive pattern lines. The number of the transparent conductive pattern lines in a region distant from the light source part may be greater than the number of the transparent conductive pattern lines in a region close to the light source part. A width of the transparent conductive pattern line in a region distant from the light source part may be greater than a width of the transparent conductive pattern line in a region close to the light source part.

BRIEF DESCRIPTION OF THE DRAWINGS

The accompanying figures are included to provide a further understanding of the invention, and are incorporated in and constitute a part of this specification. The drawings illustrate exemplary embodiments of the invention and, together with the description, serve to explain principles of the invention. In the figures.

DETAILED DESCRIPTION OF THE INVENTION

Figure 1:
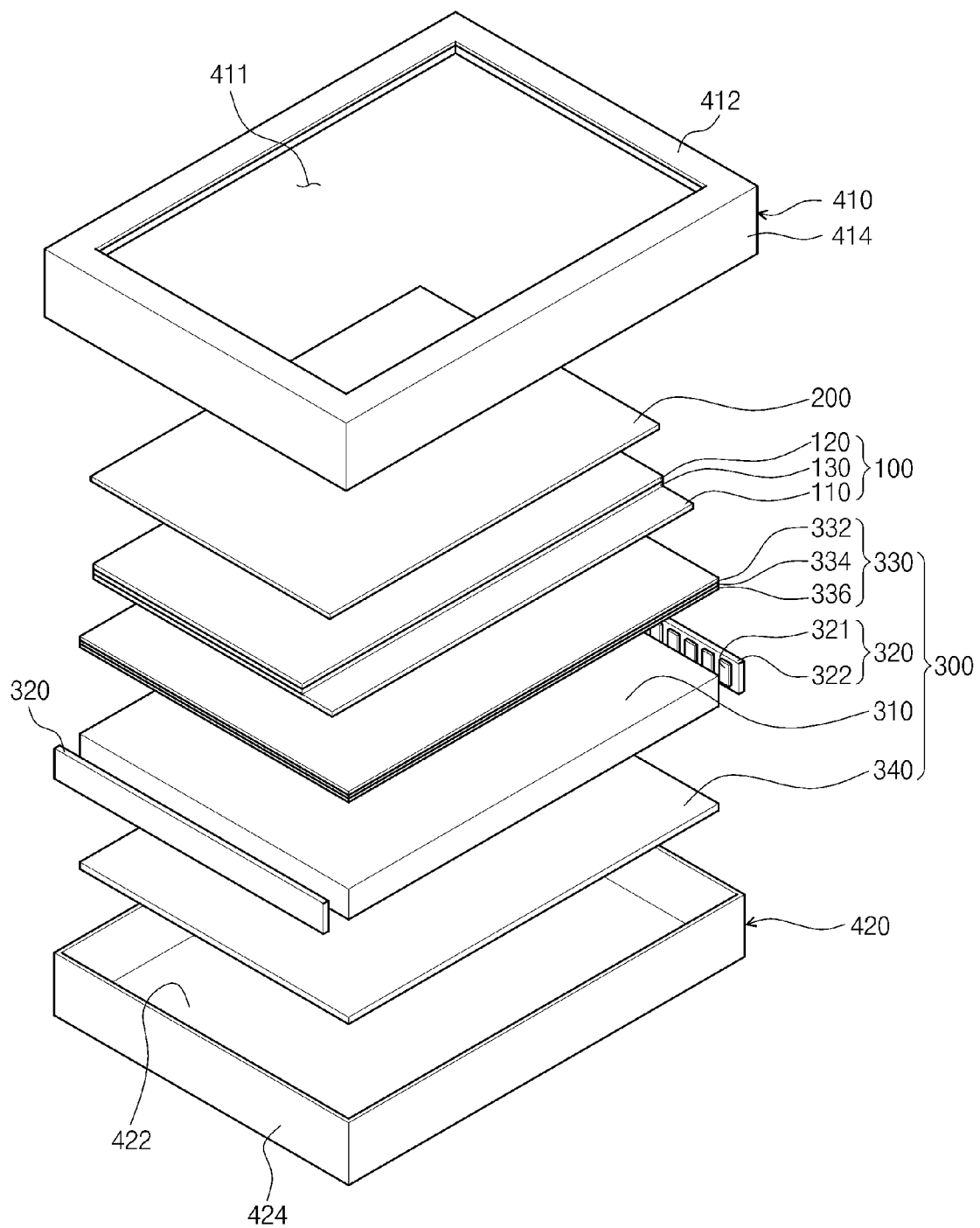
FIG. 1 is an exploded perspective view illustrating an exemplary embodiment of a liquid crystal display apparatus according the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the invention will now be described in detail with reference to the accompanying drawings.

Figure 2:
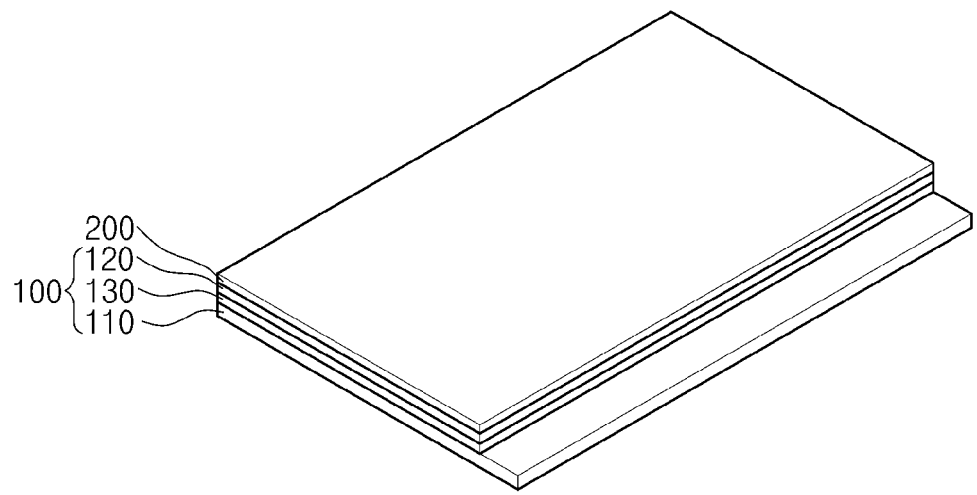
FIG. 2 is a perspective view illustrating an exemplary embodiment of a liquid crystal display panel and a panel temperature adjusting member of FIG. 1.

FIG. 1 is an exploded perspective view illustrating an exemplary embodiment of a liquid crystal display apparatus according to the invention. FIG. 2 is a perspective view illustrating an exemplary embodiment of a liquid crystal display panel and a panel temperature adjusting member of FIG. 1.

Referring to FIGS. 1 and 2, a liquid crystal display apparatus according to the illustrated embodiment includes a liquid crystal display panel 100, a panel temperature adjusting member 200, a backlight unit 300, an upper cover 410, and a lower cover 420.

The liquid crystal display panel 100 has a rectangular plate shape with long sides and short sides, and displays an image in a display region. The liquid crystal display panel 100 includes an array substrate 110, an opposite substrate 120 opposed to the array substrate 110, and a liquid crystal layer 130 disposed between the array substrate 110 and the opposite substrate 120.

The array substrate 110 may include pixels (not shown) in a matrix shape. In an exemplary embodiment, each pixel includes a gate line (not shown) extending in a first direction, a data line (not shown) extending in a second direction crossing the first direction and electrically insulated from the gate line, and a pixel electrode (not shown). Each pixel includes a thin film transistor (not shown) that is electrically connected to the gate line, the data line, and the pixel electrode. Each thin film transistor switches a driving signal that is provided to the corresponding pixel electrode. A light blocking film (not shown) may be disposed between the pixels. The light blocking film prevents reflection of external light by a metal line such as the thin film transistor, the gate line, and the data line. Thus, the light blocking film reduces or effectively prevents contrast degradation of the liquid crystal display panel 100.

A driver integrated circuit ("IC") (not shown) may be disposed at a side of the array substrate 110. The driver IC receives various signals, and outputs the driving signal for driving the liquid crystal display panel 100, to the thin film transistor in response to various input control signals.

The opposite substrate 120 may include a red, green and blue ("RGB") color filter (not shown) and a common electrode (not shown) on a surface thereof. The RGB color filter receives light from the backlight unit 300 to create a predetermined color. The common electrode is disposed on the RGB color filter and is opposed to the pixel electrode. The RGB color filter may be formed through a thin film process. The RGB color filter is provided to the opposite substrate 120 in the illustrated embodiment, but the invention is not limited thereto. In an alternative exemplary embodiment, for example, the RGB color filter may be disposed on the array substrate 110.

The liquid crystal layer 130 has a specific arrangement direction according to a voltage applied to the pixel electrode and the common electrode, to thereby adjust the transmissivity of light emitted from the backlight unit 300, so that the liquid crystal display panel 100 can display an image.

The liquid crystal display panel 100 may include a polarization film (not shown) on a light emitting surface thereof.

The panel temperature adjusting member 200 is disposed on at least one of two opposing surfaces of the liquid crystal display panel 100, e. g., on a light emitting surface to maintain the liquid crystal display panel 100 at uniform temperature. In particular, the panel temperature adjusting member 200 maintains the liquid crystal layer 130 at uniform temperature. Thus, the panel temperature adjusting member 200 reduces or effectively prevents displaying quality of the liquid crystal display apparatus from being degraded by uneven temperature of the liquid crystal layer 130. Although being disposed on the light emitting surface of the liquid crystal display panel 100 in the illustrated embodiment, the panel temperature adjusting member 200 may be disposed on the surface of the liquid crystal display panel 100 opposite to the light emitting surface, e.g., a light incident surface. Furthermore, the panel temperature adjusting member 200 may be disposed on both of the opposing surfaces of the liquid crystal display panel 100.

The backlight unit 300 may be disposed at a side of the liquid crystal display panel 100, e.g., at the side adjacent to the array substrate 110 to supply light to the liquid crystal display panel 100. The light supplied to the liquid crystal display panel 100 is emitted to another side of the liquid crystal display panel 100, e.g., to the side adjacent to the opposite substrate 120. The backlight unit 300 includes a light guide plate 310, a plurality of light source parts 320 including light sources, an optical member 330, and a reflective sheet 340.

The light guide plate 310 is disposed under the liquid crystal display panel 100, and guides light from the light source parts 320 to the liquid crystal display panel 100. Particularly, the light guide plate 310 overlaps at least the display region of the liquid crystal display panel 100. The light guide plate 310 includes a light emitting surface for emitting light, a bottom surface opposed to the light emitting surface, and side surfaces connecting the light emitting surface to the bottom surface. At least one of the side surfaces may be a light incident surface facing the light source parts 320 and receiving light emitted from the light source parts 320. The side surface opposed to the light incident surface may be a light facing surface for reflecting light.

A light source part 320 may include light sources 321 which are mounted, e.g., light-emitting diodes on a printed circuit board ("PCB") 322. The light source parts 320 are disposed to emit light toward at least one of the side surfaces of the light guide plate 310, e.g., toward opposite side surfaces of the light guide plate 310, so that light used for the liquid crystal display panel 100 to display an image can be provided through the light guide plate 310.

The optical member 330 is disposed between the light guide plate 310 and the liquid crystal display panel 100. The optical member 330 controls light emitted from the light source parts 320 through the light guide plate 310. The optical member 330 includes a diffusion sheet 336, a prism sheet 334, and a protective sheet 332, which are sequentially stacked.

The diffusion sheet 336 diffuses light emitted from the light guide plate 310. The prism sheet 334 collects light, diffused by the diffusion sheet 336, in a direction perpendicular to a plane of the liquid crystal display panel 100 disposed over the prism sheet 334. Most of the light passing through the prism sheet 334 is perpendicularly incident to the liquid crystal display panel 100. The protective sheet 332 is disposed on the prism sheet 334. The protective sheet 332 protects the prism sheet 334 from external shock.

The optical member 330 includes a single sheet as each of the diffusion sheet 336, the prism sheet 334, and the protective sheet 332, but is not limited thereto. At least one of the diffusion sheet 336, the prism sheet 334, and the protective sheet 332 may be provided in plurality to the optical member 330, or one of the diffusion sheet 336, the prism sheet 334, and/or the protective sheet 332 may be removed.

The reflective sheet 340 reflects otherwise wasted light back to the liquid crystal display panel 100, and is disposed under the light guide plate 310. The reflective sheet 340 includes a light reflecting material. The reflective sheet 340 is disposed on the lower cover 420 to reflect light emitted from the light source parts 320. Thus, the reflective sheet 340 increases the amount of light provided to the liquid crystal display panel 100.

The upper cover 410 is disposed over the liquid crystal display panel 100, and has a shape corresponding to the shape of the liquid crystal display panel 100. The upper cover 410 includes a display window 411 exposing the display region of the liquid crystal display panel 100, an upper part 412 supporting a peripheral edge of the top surface of the liquid crystal display panel 100, and an upper cover side wall 414 extending from the upper part 412 toward the lower cover 420. Since the liquid crystal display panel 100 has a tetragonal plate shape, the upper cover side wall 414 may have four side surfaces. The upper cover 410 is coupled to the lower cover 420 to support the peripheral edge of the top surface of the liquid crystal display panel 100.

The lower cover 420 is disposed under the backlight unit 300. The lower cover 420 includes a bottom 422 having a shape corresponding to the shapes of the liquid crystal display panel 100 and the backlight unit 300, and a lower cover side wall 424 extending upward from the bottom 422. Since the liquid crystal display panel 100 and the backlight unit 300 have a tetragonal shape, the lower cover side wall 424 may have four side surfaces. The bottom 422 and the lower cover side wall 424 forms a space to accommodate the liquid crystal display panel 100 and the backlight unit 300. The lower cover 420 is coupled to the upper cover 410 to accommodate and support the liquid crystal display panel 100 and the backlight unit 300.

The panel temperature adjusting member 200 will now be described in more detail with reference to FIGS. 3 and 4.

Figure 3:
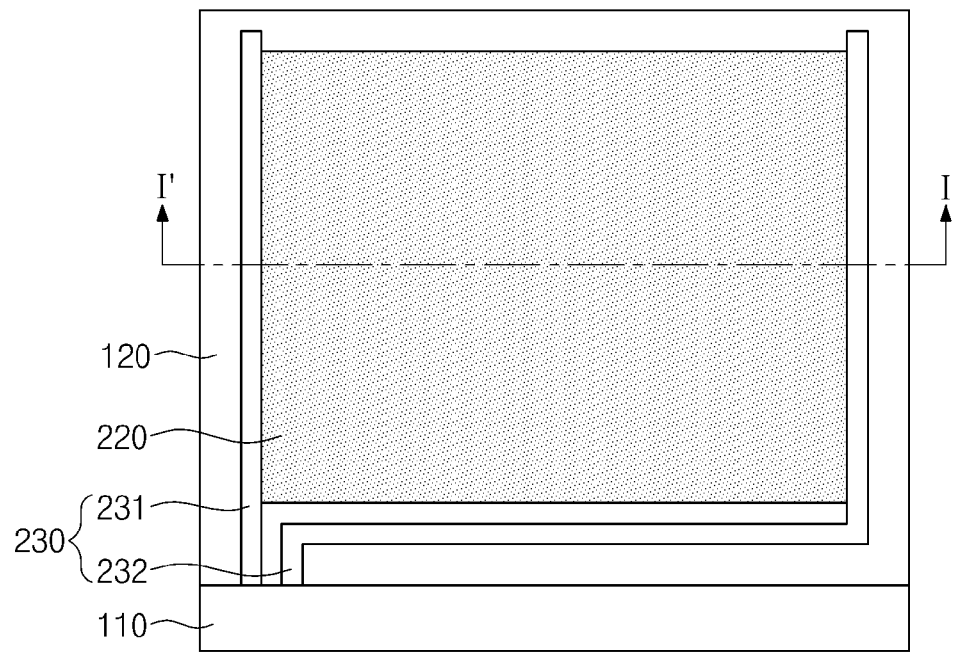
FIG. 3 is a plan view illustrating the liquid crystal display panel and the panel temperature adjusting member of FIG. 2.

FIG. 3 is a plan view illustrating the liquid crystal display panel and the panel temperature adjusting member of FIG. 2. FIG. 4 is a cross-sectional view taken along line I-I' of FIG. 3.

Figure 4:
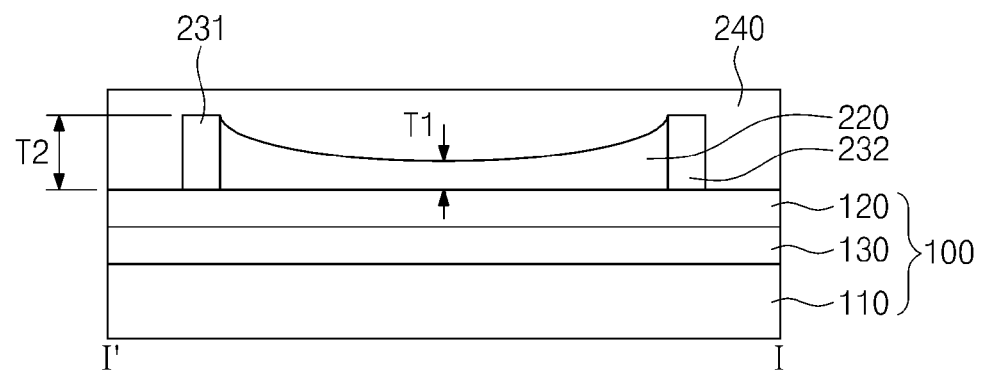
FIG. 4 is a cross-sectional view taken along line I-I' of FIG. 3.

Referring to FIGS. 3 and 4, the panel temperature adjusting member 200 is disposed on at least one surface of the liquid crystal display panel 100. In more detail, the panel temperature adjusting member 200 may be disposed on the light emitting surface of the liquid crystal display panel 100, e.g., on a light emitting surface of the opposite substrate 120. The panel temperature adjusting member 200 may be disposed on the opposite surface to the light emitting surface of the liquid crystal display panel 100, e.g., on the opposite surface to a light emitting surface of the array substrate 110. The panel temperature adjusting member 200 may be disposed on both the surfaces of the liquid crystal display panel 100. In the following description, the panel temperature adjusting member 200 is disposed on the light emitting surface of the liquid crystal display panel 100.

The panel temperature adjusting member 200 includes a transparent resistor 220 disposed on the light emitting surface of the liquid crystal display panel 100, that is, on the opposite substrate 120, and a power supply 230 supplying power to the transparent resistor 220.

The transparent resistor 220 may be a transparent conductive film. The transparent conductive film may be a thin film including any one of a transparent conductive metal oxide and a transparent conductive polymer. The transparent conductive metal oxide may be an indium tin oxide ("ITO") or an indium zinc oxide ("IZO"). The transparent conductive polymer may be a polyanilin-based polymer or a polythiophene-based polymer including poly-styrenesulfonate ("PSS"). The transparent conductive film may be a thin film including conductive nano tubes such as carbon nano tubes, conductive nano wires such as metal nano wires, and conductive particles such as conductive nano particles. The conductive particles may be dispersed in an organic binder.

A vertical thickness T2 of the transparent resistor 220 on the opposite substrate 120 in a region close to the light source parts 320 is greater than a vertical thickness T1 of the transparent resistor 220 on the opposite substrate 120 in a region distant from the light source parts 320. Accordingly, a portion of the transparent resistor 220, which is distant from the light source parts 320 emits a larger amount of heat than a portion of the transparent resistor 220, which is close to the light source parts 320. This is because resistance of a conductor is inversely proportional to its cross-sectional area. The transparent resistor 220 may be a single, unitary, indivisible member.

The power supply 230 includes a first electrode 231 and a second electrode 232 to supply power to the transparent resistor 220. The power supply 230 and the transparent resistor 220 may include the same material.

The power supply 230 has any shape, provided that the power supply 230 uniformly supplies power to the transparent resistor 220.

The panel temperature adjusting member 200 may include a transparent protective film 240. The transparent protective film 240 covers at least the transparent resistor 220. The transparent protective film 240 may cover both the transparent resistor 220 and the power supply 230.

The transparent protective film 240 may include an organic material, an inorganic material, an organic/inorganic hybrid, or a combination thereof. A material of the transparent protective film 240 may be similar in refractivity to a material of the transparent resistor 220. Accordingly, image distortion of the liquid crystal display panel 100 due to the transparent resistor 220 can be reduced or effectively prevented.

Hereinafter, an operation of the liquid crystal display apparatus including the panel temperature adjusting member 200 will now be described.

When power is supplied to the liquid crystal display apparatus, the light source parts 320 of the backlight unit 300 provide light to the light incident surfaces of the light guide plate 310. The light incident to the light guide plate 310 is supplied to the liquid crystal display panel 100 through the light emitting surface of the light guide plate 310. The light supplied to the liquid crystal display panel 100 passes through the pixels of the liquid crystal display panel 100 to display an image.

Point light sources such as light emitting diodes are used as the light sources 321 of the light source parts 320. Thus, the light sources 321 generate heat as well as light from the supplied power. The heat generated from the light sources 321 heats the liquid crystal display panel 100, and thus, a region of the liquid crystal display panel 100, which is close to the light source parts 320, may be higher in temperature than a region of the liquid crystal display panel 100, which is distant from the light source parts 320.

In this case, power is applied to the panel temperature adjusting member 200. Then, the transparent resistor 220 receives power from the power supply 230, and generates heat. At this point, the portion of the transparent resistor 220, which is distant from the light source parts 320, emits a larger amount of heat than the portion of the transparent resistor 220, which is close to the light source parts 320 since the vertical thickness T2 of the transparent resistor 220 on the opposite substrate 120 in the region close to the light source parts 320 is greater than the vertical thickness T1 of the transparent resistor 220 on the opposite substrate 120 in the region distant from the light source parts 320.

Thus, while the liquid crystal display apparatus is operated, the panel temperature adjusting member 200 reduces or effectively prevents uneven temperature distribution of the liquid crystal display panel 100 due to heat generated from the light sources 321, particularly, uneven temperature distribution of the liquid crystal layer 130. Accordingly, the displaying quality of the liquid crystal display apparatus can be stabilized.

Figure 5:
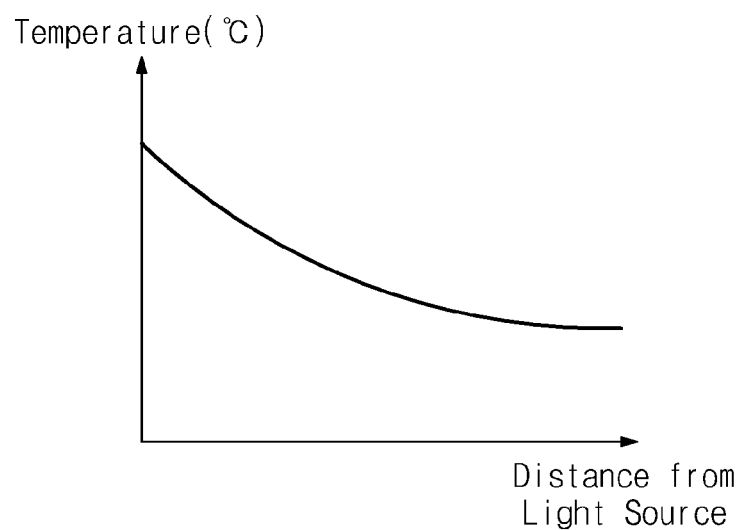
FIG. 5 is a graph illustrating temperature distribution of a liquid crystal display panel of a typical liquid crystal display apparatus without a panel temperature adjusting member.
Figure 6:
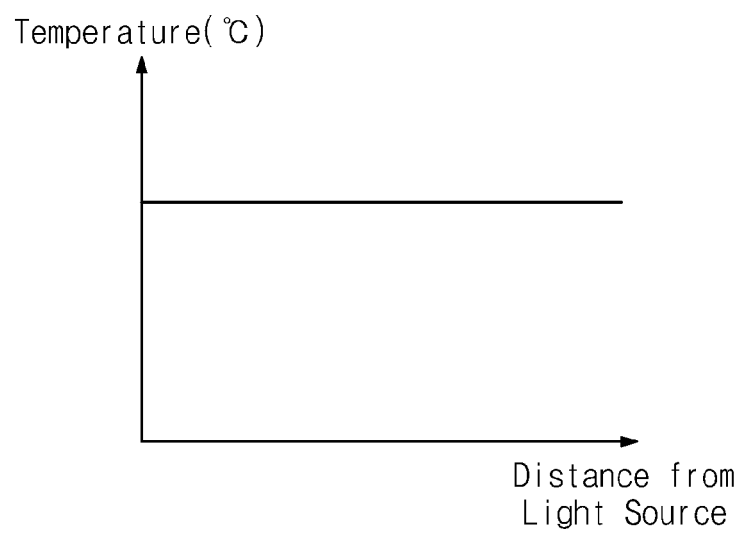
FIG. 6 is a graph illustrating temperature distribution of an exemplary embodiment of a liquid crystal display panel of a liquid crystal display apparatus according to the invention.

FIG. 5 is a graph illustrating temperature distribution of a liquid crystal display panel of a typical liquid crystal display apparatus without a panel temperature adjusting member. FIG. 6 is a graph illustrating temperature distribution of an exemplary embodiment of a liquid crystal display panel of a liquid crystal display apparatus according to the invention.

Referring to FIGS. 5 and 6, the liquid crystal display panel 100 of a liquid crystal display apparatus without the panel temperature adjusting member 200 has uneven temperature distribution. This is because heat generated from the light source part 320 is concentrated in a region of the liquid crystal display panel 100 near the light source part 320.

On the contrary, the liquid crystal display panel 100 of a liquid crystal display apparatus including the panel temperature adjusting member 200 has even temperature distribution. This is because the panel temperature adjusting member 200 provides a larger amount of heat to the central portion of the liquid crystal display panel 100. Thus, since the liquid crystal display panel 100 of the liquid crystal display apparatus including the panel temperature adjusting member 200 has even temperature distribution in the liquid crystal layer 130, the displaying quality thereof is uniform.

Hereinafter, a liquid crystal display apparatus according to other embodiments of the invention will now be described with reference to FIGS. 7 to 14. Like reference numerals refer to like elements in FIGS. 1 to 14, and a description of the same components as those of FIGS. 1 to 4 will be omitted in the following embodiments. Thus, the following embodiments will now be described with respect to different parts from those of FIGS. 1 to 4.

Figure 7:
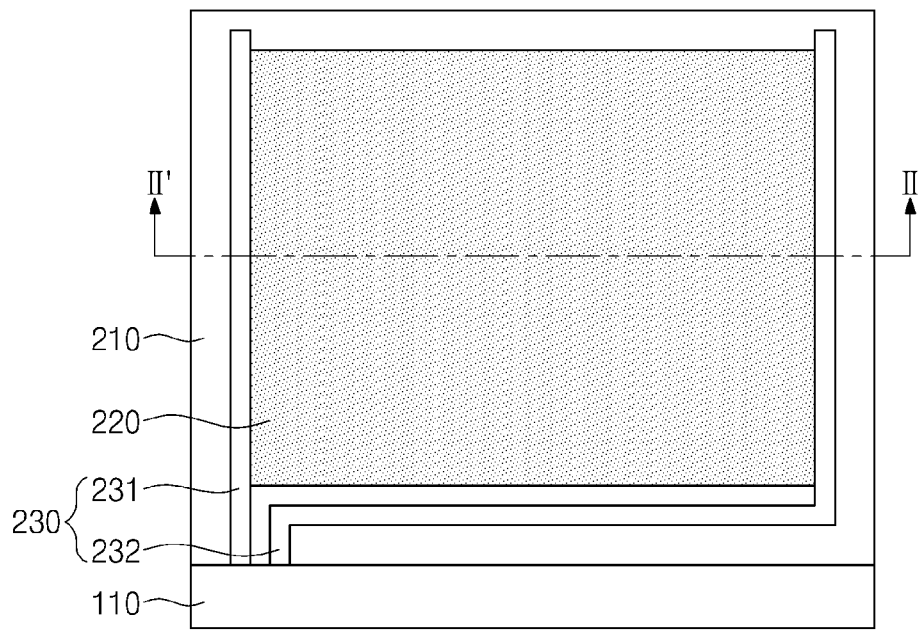
FIG. 7 is a plan view illustrating another exemplary embodiment of a liquid crystal display panel and a panel temperature adjusting member of a liquid crystal display apparatus according to the invention.
Figure 8:
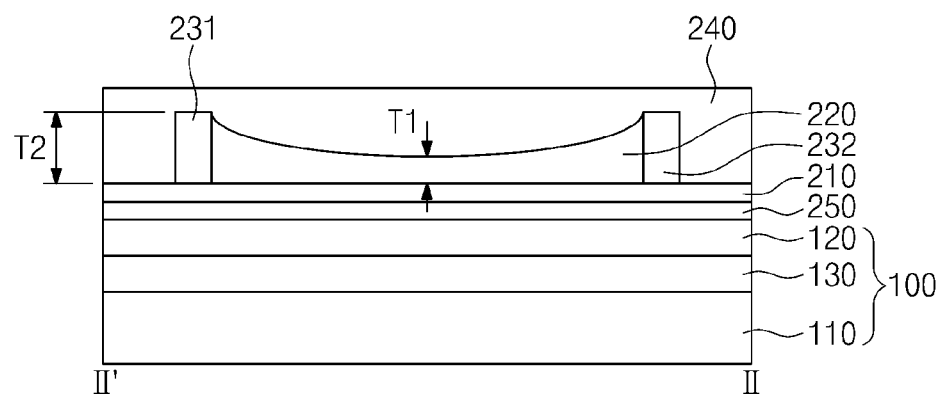
FIG. 8 is a cross-sectional view taken along line II-II' of FIG. 7.

FIG. 7 is a plan view illustrating another exemplary embodiment of a liquid crystal display panel and a panel temperature adjusting member of a liquid crystal display apparatus according to the invention. FIG. 8 is a cross-sectional view taken along line II-II' of FIG. 7.

Referring to FIGS. 7 and 8, a panel temperature adjusting member 200 includes a base substrate 210 disposed on a surface of a liquid crystal display panel 100, a transparent resistor 220 disposed on the base substrate 210, and a power supply 230 supplying power to the transparent resistor 220. That is, the transparent resistor 220 and the power supply 230 may be disposed on the base substrate 210. The panel temperature adjusting member 200 may include a transparent protective film 240 to cover at least the transparent resistor 220.

The base substrate 210 supports the transparent resistor 220 to provide mechanical strength to the transparent resistor 220. The base substrate 210 may include any transparent material, such as glass or a transparent polymer film.

The base substrate 210 may have a thickness ranging from about 20 micrometers (μm) to about 1000 μm according to mechanical strength. If the thickness of the base substrate 210 is smaller than about 20 μm, the base substrate 210 may have poor mechanical strength, and be difficult to handle in a process of forming the transparent resistor 220, the power supply 230, and the transparent protective film 240. If the thickness of the base substrate 210 is greater than about 1000 μm, transmissivity of the base substrate 210 may be degraded.

The panel temperature adjusting member 200 may further include a field blocking film 250 between the base substrate 210 and the liquid crystal display panel 100. The field blocking film 250 blocks an electric field formed by supplying power to the transparent resistor 220 and the power supply 230, to reduce or effectively prevent abnormal behaviors of liquid crystal molecules in a liquid crystal layer 130 of the liquid crystal display panel 100. The field blocking film 250 includes a transparent conductive material. In one exemplary embodiment, for example, the field blocking film 250 and the transparent resistor 220 may include the same material.

When the transparent resistor 220 and the power supply 230 are disposed on the base substrate 210 as described above, the panel temperature adjusting member 200 may be produced separately from the liquid crystal display panel 100. Thus, the panel temperature adjusting member 200 can be easily installed on the liquid crystal display panel 100.

Figure 9:
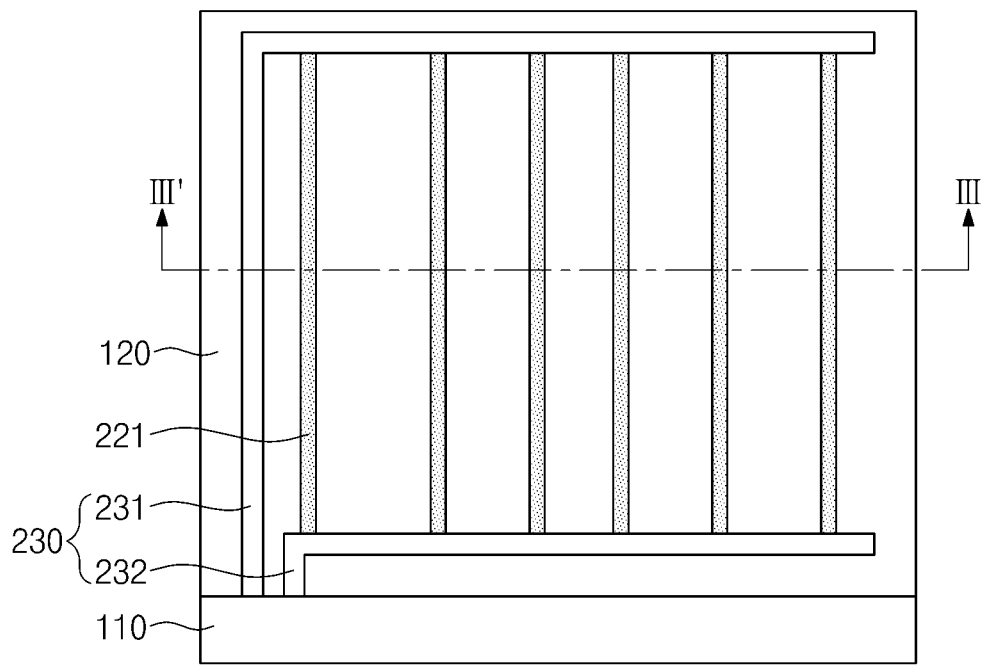
FIG. 9 is a plan view illustrating another exemplary embodiment of a liquid crystal display panel and a panel temperature adjusting member of a liquid crystal display apparatus according to the invention.
Figure 10:
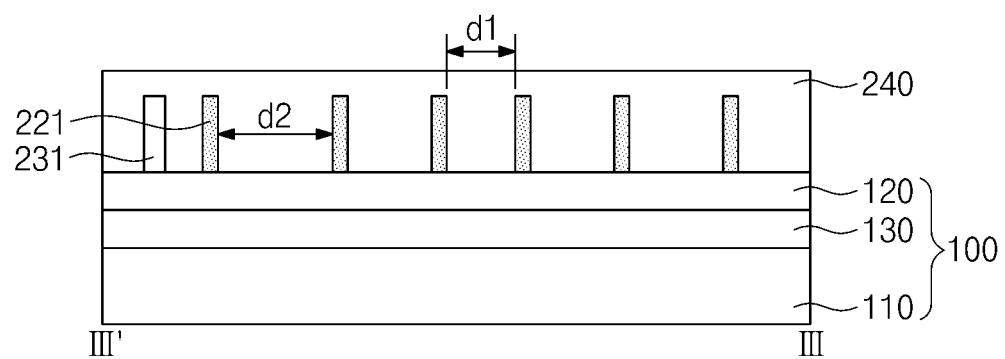
FIG. 10 is a cross-sectional view taken along line III-III' of FIG. 9.

FIG. 9 is a plan view illustrating another exemplary embodiment of a liquid crystal display panel and a panel temperature adjusting member of a liquid crystal display apparatus according to the invention. FIG. 10 is a cross-sectional view taken along line III-III' of FIG. 9.

Referring to FIGS. 9 and 10, a panel temperature adjusting member 200 includes a transparent resistor 220 including transparent conductive pattern lines 221, and a power supply 230 supplying power to the transparent resistor 220. The panel temperature adjusting member 200 may include a transparent protective film 240 to cover at least the transparent resistor 220.

The transparent conductive pattern lines 221 longitudinally extend from a first electrode 231 of the power supply 230 to a second electrode 232, and may be parallel to one another. A distance d1 between adjacent transparent conductive pattern lines 221 in a region distant from the light source parts 320 is smaller than a distance d2 between adjacent transparent conductive pattern lines 221 in a region close to the light source parts 320. That is, the number of the transparent conductive pattern lines 221 in the region distant from the light source parts 320 is greater than the number of the transparent conductive pattern lines 221 in the region close to the light source parts 320. Accordingly, a portion of the transparent resistor 220, which is distant from the light source parts 320 emits a larger amount of heat than a portion of the transparent resistor 220, which is close to the light source parts 320.

The transparent conductive pattern line 221 may be a thin film including any one of a transparent conductive metal oxide and a transparent conductive polymer, like a transparent conductive film of the transparent resistor 220 illustrated in FIGS. 3 and 4, or be a thin film including conductive particles such as carbon nano tubes and metal nano wires dispersed in an organic binder.

Figure 11:
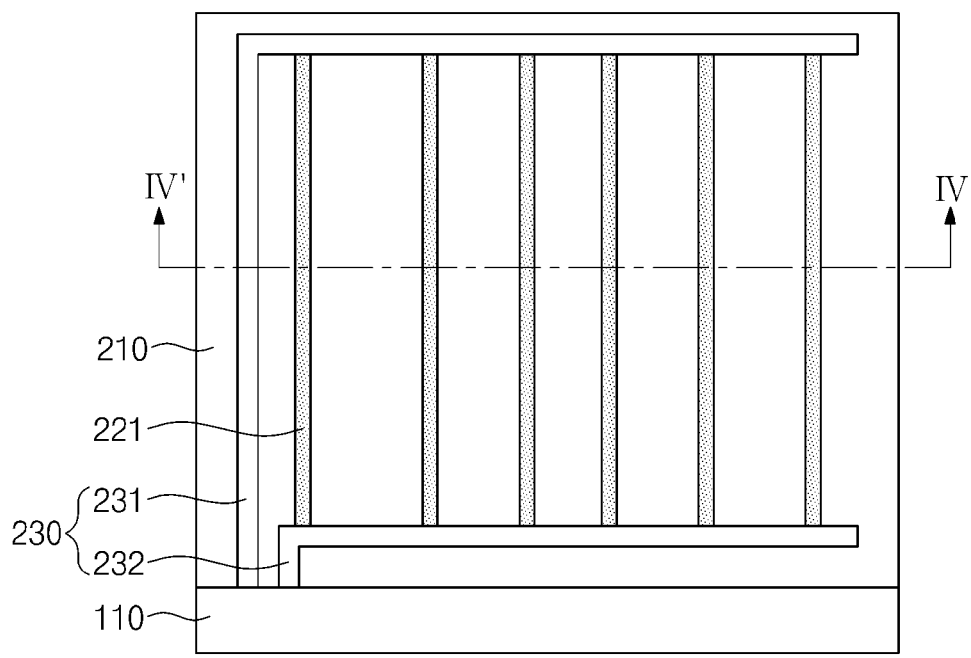
FIG. 11 is a plan view illustrating another exemplary embodiment of a liquid crystal display panel and a panel temperature adjusting member of a liquid crystal display apparatus according to the invention.
Figure 12:
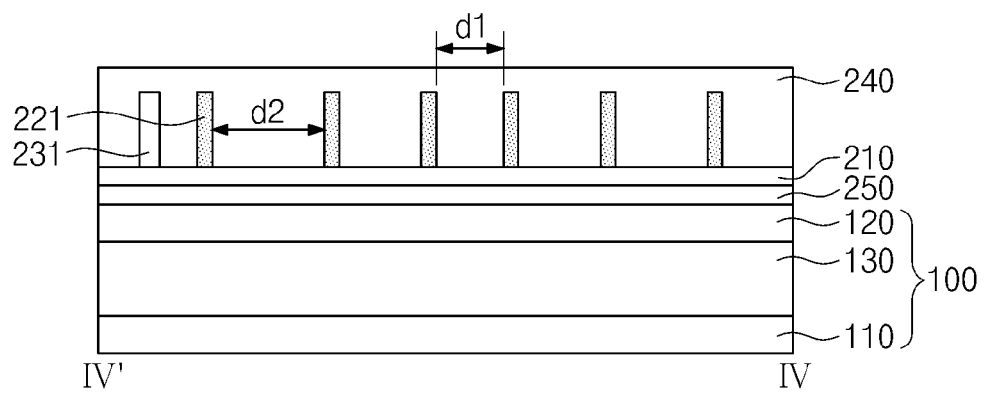
FIG. 12 is a cross-sectional view taken along line IV-IV' of FIG. 11.

FIG. 11 is a plan view illustrating another exemplary embodiment of a liquid crystal display panel and a panel temperature adjusting member of a liquid crystal display apparatus according to the invention. FIG. 12 is a cross-sectional view taken along line IV-IV' of FIG. 11.

Referring to FIGS. 11 and 12, a panel temperature adjusting member 200 includes a base substrate 210 disposed on a liquid crystal display panel 100, a transparent resistor 220 disposed on the base substrate 210 and including transparent conductive pattern lines 221, and a power supply 230 supplying power to the transparent resistor 220. The panel temperature adjusting member 200 may include a transparent protective film 240 to cover at least the transparent resistor 220.

The panel temperature adjusting member 200 may include a field blocking film 250 between the base substrate 210 and the liquid crystal display panel 100.

Figure 13:
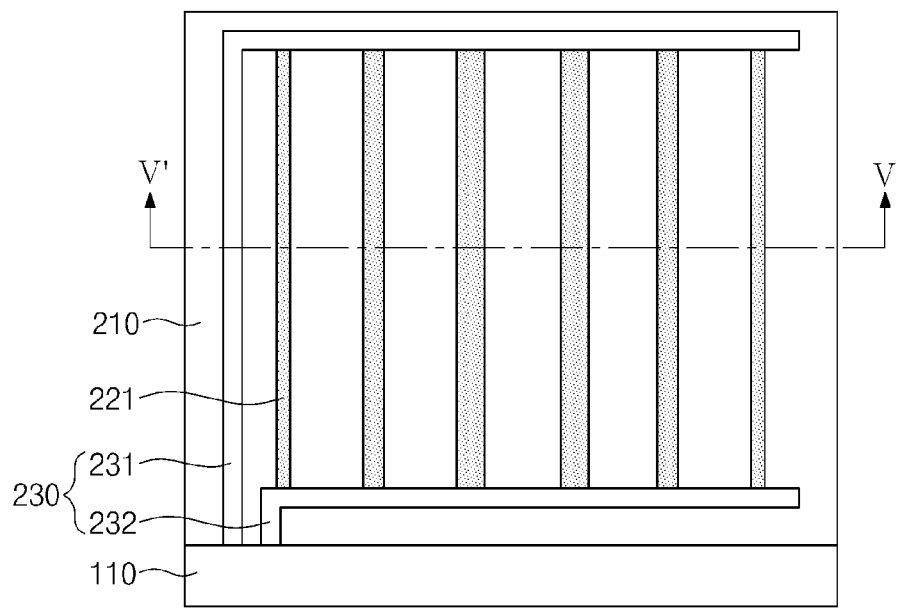
FIG. 13 is a plan view illustrating another exemplary embodiment of a liquid crystal display panel and a panel temperature adjusting member of a liquid crystal display apparatus according to the invention.
Figure 14:
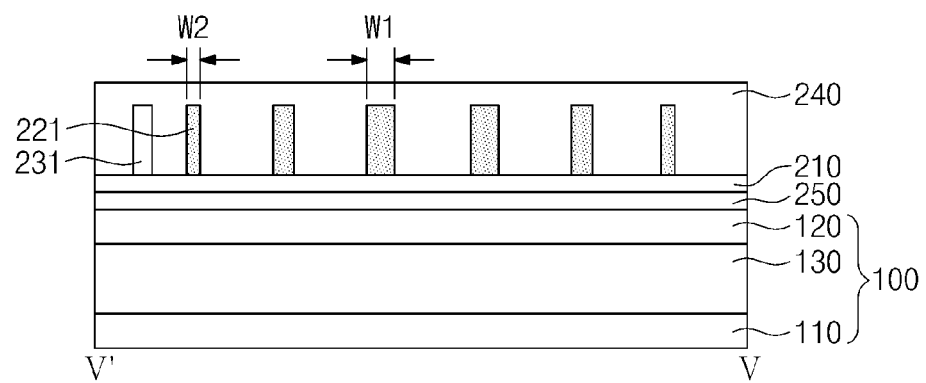
FIG. 14 is a cross-sectional view taken along line V-V' of FIG. 13.

FIG. 13 is a plan view illustrating another exemplary embodiment of a liquid crystal display panel and a panel temperature adjusting member of a liquid crystal display apparatus according to the invention. FIG. 14 is a cross-sectional view taken along line V-V' of FIG. 13.

Referring to FIGS. 13 and 14, a panel temperature adjusting member 200 includes a transparent resistor 220 including transparent conductive pattern lines 221, and a power supply 230 supplying power to the transparent resistor 220. The panel temperature adjusting member 200 may include a transparent protective film 240 to cover at least the transparent resistor 220. The panel temperature adjusting member 200 may include a field blocking film 250 between the base substrate 210 and the liquid crystal display panel 100.

The transparent conductive pattern lines 221 longitudinally extend from a first electrode 231 of the power supply 230 to a second electrode 232, and may be parallel to one another. The transparent conductive pattern lines 221 may be spaced apart from one another by the same distance. A width W1 of the transparent conductive pattern lines 221 in a region distant from the light source parts 320 is greater than a width W2 of the transparent conductive pattern lines 221 in a region close to the light source parts 320. Accordingly, a portion of the transparent resistor 220, which is distant from the light source parts 320 emits a larger amount of heat than a portion of the transparent resistor 220, which is close to the light source parts 320.

As described above, a liquid crystal display apparatus according to exemplary embodiments of the invention includes a panel temperature adjusting member on a surface of a liquid crystal display panel. The panel temperature adjusting member reduces or effectively prevents uneven temperature of a liquid crystal layer due to light source parts of a backlight unit, thereby providing uniform displaying quality to the liquid crystal display apparatus.

The above-disclosed subject matter is to be considered illustrative and not restrictive, and the appended claims are intended to cover all such modifications, enhancements, and other embodiments, which fall within the true spirit and scope of the invention. Thus, to the maximum extent allowed by law, the scope of the invention is to be determined by the broadest permissible interpretation of the following claims and their equivalents, and shall not be restricted or limited by the foregoing detailed description.

What is claimed is:

1. A liquid crystal display apparatus comprising:
a liquid crystal display panel which displays an image;
a backlight unit including a light source part which generates light, and supplies the light to the liquid crystal display panel; and
a panel temperature adjusting member on a surface of the liquid crystal display panel, and including a transparent resistor, and a power supply which supplies power to the transparent resistor,
wherein the transparent resistor emits a larger amount of heat to a region of the liquid crystal display panel, which is distant from the light source part, than to a region of the liquid crystal display panel, which is close to the light source part, such that the liquid crystal display panel has uniform temperature distribution.

2. The liquid crystal display apparatus of claim 1, wherein the transparent resistor comprises a transparent conductive film.

3. The liquid crystal display apparatus of claim 2, wherein a thickness of the transparent conductive film in a region close to the light source part is greater than a thickness of the transparent conductive film in a region distant from the light source part.

4. The liquid crystal display apparatus of claim 2, wherein the transparent conductive film comprises a transparent conductive metal oxide or a transparent conductive polymer.

5. The liquid crystal display apparatus of claim 2, wherein the transparent conductive film comprises a thin film including a conductive nano tube, a conductive nano wire, or a conductive nano particle.

6. The liquid crystal display apparatus of claim 2, wherein the power supply and the transparent conductive film include the same material.

7. The liquid crystal display apparatus of claim 1, wherein the panel temperature adjusting member further includes a base substrate between the liquid crystal display panel and the transparent resistor.

8. The liquid crystal display apparatus of claim 7, wherein the panel temperature adjusting member further includes a field blocking film between the base substrate and the liquid crystal display panel, and including a transparent conductive material.

9. The liquid crystal display apparatus of claim 1, wherein the panel temperature adjusting member further includes a transparent protective film which overlaps the transparent resistor.

10. The liquid crystal display apparatus of claim 9, wherein the transparent protective film overlaps the transparent resistor and the power supply.

11. The liquid crystal display apparatus of claim 1, wherein the transparent resistor comprises transparent conductive pattern lines.

12. The liquid crystal display apparatus of claim 11, wherein the transparent conductive pattern lines comprise a transparent conductive metal oxide or a transparent conductive polymer.

13. The liquid crystal display apparatus of claim 11, wherein the transparent conductive pattern lines include a thin film in which conductive particles are dispersed in an organic binder.

14. The liquid crystal display apparatus of claim 13, wherein the conductive particles include carbon nano tubes or metal nano wires.

15. The liquid crystal display apparatus of claim 11, wherein a number of the transparent conductive pattern lines in a region distant from the light source part is greater than a number of the transparent conductive pattern lines in a region close to the light source part.

16. The liquid crystal display apparatus of claim 11, wherein a distance between adjacent transparent conductive pattern lines in a region distant from the light source part is smaller than a distance between adjacent transparent conductive pattern lines in a region close to the light source part.

17. The liquid crystal display apparatus of claim 11, wherein a width of the transparent conductive pattern lines in a region distant from the light source part is greater than a width of the transparent conductive pattern lines in a region close to the light source part.

18. The liquid crystal display apparatus of claim 17, wherein the transparent conductive pattern lines are spaced apart from one another by the same distance.

19. The liquid crystal display apparatus of claim 1, wherein the panel temperature adjusting member faces a light emitting surface of the liquid crystal display panel.

20. The liquid crystal display apparatus of claim 1, wherein the panel temperature adjusting member faces a surface of the liquid crystal display panel which is opposite to a light emitting surface of the liquid crystal display panel.

* * * * *